US010002610B2

(12) United States Patent
Tanaka et al.

(10) Patent No.: US 10,002,610 B2
(45) Date of Patent: Jun. 19, 2018

(54) PRESENTATION SUPPORTING DEVICE, PRESENTATION SUPPORTING METHOD, AND COMPUTER-READABLE RECORDING MEDIUM

(71) Applicant: FUJITSU LIMITED, Kawasaki-shi, Kanagawa (JP)

(72) Inventors: Masakiyo Tanaka, Hachioji (JP); Jun Takahashi, Kawasaki (JP); Kentaro Murase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 15/057,826

(22) Filed: Mar. 1, 2016

(65) Prior Publication Data

US 2016/0275050 A1    Sep. 22, 2016

(30) Foreign Application Priority Data

Mar. 18, 2015   (JP) ................. 2015-055438

(51) Int. Cl.
G06F 17/00 (2006.01)
G10L 15/22 (2006.01)
G06F 17/22 (2006.01)
H04N 21/85 (2011.01)
G10L 25/48 (2013.01)
(Continued)

(52) U.S. Cl.
CPC .......... *G10L 15/22* (2013.01); *G06F 17/2229* (2013.01); *G06F 17/2235* (2013.01); *G10L 25/48* (2013.01); *H04N 21/85* (2013.01); *G10L 15/26* (2013.01); *G10L 2015/088* (2013.01)

(58) Field of Classification Search
CPC .................. G06F 17/27; G06F 17/21
See application file for complete search history.

(56) References Cited

U.S. PATENT DOCUMENTS 6,076,061 A    6/2000   Kawasaki et al.
6,263,308 B1 *  7/2001   Heckerman ........... G10L 15/063
                                              704/231
(Continued)

FOREIGN PATENT DOCUMENTS

JP    H06-223104 A    8/1994
JP    H08-83093 A     3/1996
(Continued)

*Primary Examiner* — Stephen S Hong
*Assistant Examiner* — Marshon Robinson
(74) *Attorney, Agent, or Firm* — Fujitsu Patent Center

(57) ABSTRACT

A presentation supporting device extracts a first word from a character string included in each region divided from a page of a document file, and calculates a score, for each region in a page currently-displayed, based on the first word and a second word acquired as a result of a sound recognition, and calculates, when the highest score of scores is equal to or higher than a first threshold, a distance between a first region in which the highlight display is currently executed and a second region in which the highest score is equal to or higher than the first threshold, and executes a highlight display in the second region when a frequency corresponding to the distance between the first region and the second region is equal to or higher than a second threshold, and executes a highlight display in the first region, when the second threshold is not reached.

6 Claims, 9 Drawing Sheets

(51) Int. Cl.
*G10L 15/08* (2006.01)
*G10L 15/26* (2006.01)

(56) References Cited

U.S. PATENT DOCUMENTS

| | | |
|---|---|---|
| 2003/0188255 A1 | 10/2003 | Shimizu et al. |
| 2005/0080633 A1* | 4/2005 | Lueck .................... G10L 15/22 |
| | | 704/278 |
| 2005/0102139 A1 | 5/2005 | Fukada |
| 2007/0033043 A1* | 2/2007 | Hyakumoto ........ G10L 15/1815 |
| | | 704/255 |
| 2010/0191722 A1* | 7/2010 | Boiman ............ G06F 17/30787 |
| | | 707/723 |

FOREIGN PATENT DOCUMENTS

| | | |
|---|---|---|
| JP | 2004-7358 A | 1/2004 |
| JP | 2005-150841 A | 6/2005 |
| JP | 2005-173109 A | 6/2005 |

\* cited by examiner

US 10,002,610 B2

PRESENTATION SUPPORTING DEVICE, PRESENTATION SUPPORTING METHOD, AND COMPUTER-READABLE RECORDING MEDIUM

CROSS-REFERENCE TO RELATED APPLICATION

This application is based upon and claims the benefit of priority of the prior Japanese Patent Application No. 2015-055438, filed on Mar. 18, 2015, the entire contents of which are incorporated herein by reference.

FIELD

The embodiments discussed herein are related to a presentation supporting device, a presentation supporting method, and a presentation supporting program.

BACKGROUND

As an example of a technology to support presentation, an information processing method to associate image data to sound data is proposed.

In this information processing method, a character region is detected in the image data and a character is recognized in the character region in order to associate the image data to the sound data. On the other hand, in the information processing method, a sound section is detected in sound data and sound is recognized. Then, in the information processing method, a character and sound are associated to each other by comparison/collation between a character string of the recognized character and a character string which is converted from the sound or a phonetic string which is converted from the recognized character and a phonetic string of the sound. Then, in the information processing method, a frame is assigned to a corresponding part of a still image, which part corresponds to a sound section, and a display is performed.

Moreover, in the information processing method, based on a recognition probability or the like of a candidate of character information and a recognition probability of a candidate of sound information, the candidate of the character information or the candidate of the sound information is weighted and a degree of correlation between the candidates is calculated. Then, based on the degree of correlation, the candidate of the character information and the candidate of the sound information are associated to each other.

Patent document 1: Japanese Laid-open Patent Publication No. 2004-7358
Patent document 2: Japanese Laid-open Patent Publication No. 2005-150841
Patent document 3: Japanese Laid-open Patent Publication No. 6-223104
Patent document 4: Japanese Laid-open Patent Publication No. 2005-173109

However, in the above-described technology, there is a case where a highlight display flaps due to false recognition.

That is, in the information processing method, sound recognition is used to associate image data to sound data. However, there is a limit in accuracy in the sound recognition as a matter of course. When false recognition is made, there is a case where a highlight display flaps due to a repetition of the highlight display in which repetition going back to a part described by a presenter is performed after the highlight display is moved away from the part described by the presenter. Even when weight inversely-proportional to a distance from a highlighted part is assigned to a result of sound recognition in order to control this flapping, a trouble is generated in a case where a part described by the presenter moves to a far part. For example, there is a case where movement of a highlight display is delayed greatly or a part described by the presenter is not determined to be a moving destination of the highlight display.

SUMMARY

According to an aspect of an embodiment, a presentation supporting device includes a processor that executes a process. The process includes extracting a first word from a character string included in each region divided from a page of a document file including the page displayed in a unit of a screen during a display; executing sound recognition; first calculating a score, with respect to each region in a page currently-displayed on a predetermined display device, based on the first word extracted from the region and a second word acquired as a result of the sound recognition; second calculating, when the highest score of the scores respectively-calculated for the regions is equal to or higher than a first threshold, a distance between a first region in which a highlight display is currently executed and a second region in which the highest score is equal to or higher than the first threshold; first determining to execute a highlight display in the second region when a frequency, which corresponds to the distance between the first region and the second region, among a frequency included in frequency data to which a distance between regions and a frequency of transition of a highlight display are associated is equal to or higher than a second threshold; and second determining to execute a highlight display in the first region, when the second threshold is not reached, until a frequency of the highest score becoming equal to or higher than the first threshold becomes equal to or higher than a third threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that these embodiments are not to limit the disclosed technology. Embodiments can be arbitrarily combined within the scope which does not cause a contradiction in processing contents.

[a] First Embodiment

System configuration

Figure 1:
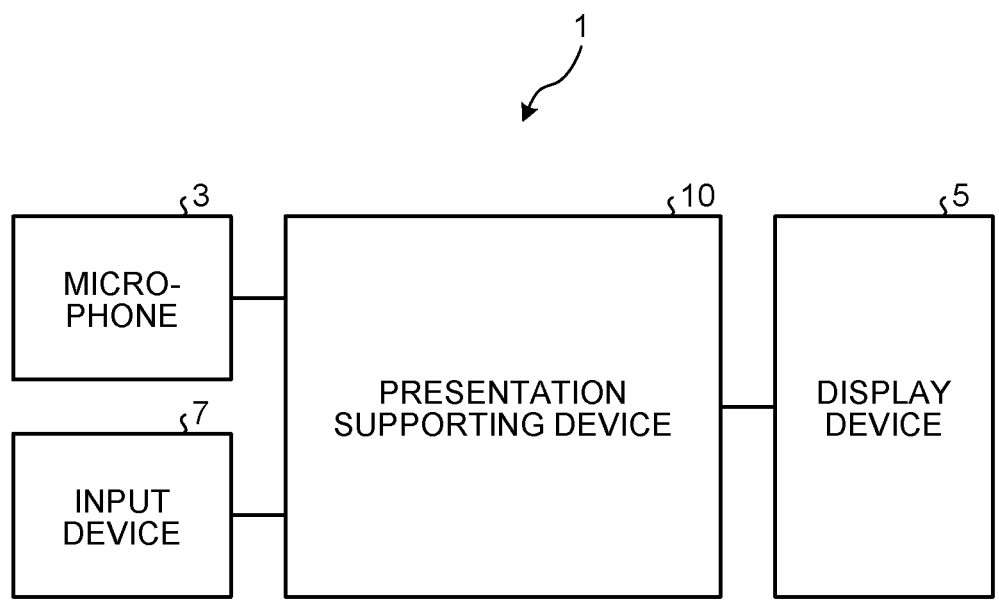
FIG. 1 is a view illustrating a configuration of a presentation supporting system according to a first embodiment.

FIG. 1 is a view illustrating a configuration of a presentation supporting system according to the first embodiment. A presentation supporting system 1 illustrated in FIG. 1 provides a presentation supporting service to perform a highlight display of a region corresponding to a result of sound recognition in a page, which is to be displayed on a display device 5, in a page screen such as a slide included in a document file.

As a part of the presentation supporting service, when a frequency corresponding to a transition distance of a region to be displayed in a highlight in a currently-displayed slide is lower than a threshold, the presentation supporting system 1 holds transition of a highlight display until a frequency of a score of sound recognition related to a region in a transition destination becoming equal to or higher than a threshold becomes higher.

Accordingly, transition of a highlight display, in which transition the highlight display moves back to a part described by a presenter due to false recognition after moving away from the part described by the presenter, is controlled in an aspect. Thus, flapping of a highlight display can be controlled. As a different aspect, holding is released when the frequency of a score of sound recognition related to a region of a transition destination becoming equal to or higher than a threshold is increased. Thus, unlike a case of assigning weight, which is inversely-proportional to a distance from a region in which a highlight-display is currently executed, to a result of sound recognition, it is possible to control a situation in which movement of a highlight display is delayed greatly or a part to be described by a presenter is not determined correctly as a transition destination of the highlight display.

Here, in the following, a case where a function related to the highlight display is added to presentation software and presentation is made by displaying one or more slides included in a document file created by utilization of the presentation software onto the display device 5 is assumed as an example. Into each slide, content such as a text or figure created by a different application program can be imported. For example, it is possible to import a document created by word-processing software, a chart or a graph created by spreadsheet software, an image or video imaged by an imaging device, or an image or video edited by image editing software.

As illustrated in FIG. 1, in the presentation supporting system 1, a microphone 3, the display device 5, an input device 7, and a presentation supporting device 10 are housed. Peripheral equipment such as the microphone 3, the display device 5, and the input device 7 are connected to the presentation supporting device 10 in a wired or wireless manner.

The microphone 3 is a device to convert sound into an electric signal. For example, the microphone 3 can be attached to a presenter who makes presentation. In this case, a headset-type or tiepin-type microphone can be attached to a predetermined position on a body or dress of the presenter or a handy-type microphone can be carried by the presenter. Also, the microphone 3 can be provided to a predetermined position in a range in which sound of a speech of the presenter can be collected. In this case, an attachment-type or fixed-type microphone can be employed as the microphone 3. In any of these cases, a microphone with an arbitrary-type of directional characteristic can be employed as the microphone 3. However, in order to control collection of undesired sound, which is other than the speech of the presenter, such as a conversation of a listener or the like or a noise, a sensitivity of the microphone can be limited to a direction of the speech of the presenter. Note that as the microphone 3, an arbitrary conversion method such as a dynamic-type, an electret condenser-type, or a condenser-type can be employed.

An analog signal acquired by collecting sound into the microphone 3 is converted into a digital signal and is input into the presentation supporting device 10.

The display device 5 is a device to display various kinds of information. For example, as the display device 5, a liquid crystal display or an organic electroluminescence (EL) display that realizes a display with emission of light or a projector to realize a display by projection can be employed. Also, the number of provided display devices 5 is not limited to one. A plurality of devices may be provided. In the following, a case where a projector and a screen that displays an image projected by the projector are mounted as shared display devices seen by both of a presenter and a listener who are participants of presentation is assumed as an example.

In an example, the display device 5 displays a presentation screen according to an instruction from the presentation supporting device 10. For example, the display device 5 displays a slide of a document file opened by presentation software operating on the presentation supporting device 10. In this case, the display device 5 can display an arbitrary slide designated by a presenter through the input device 7 among slides included in a document file or can display slides included in a document file while switching the slides in created order of pages when a slide-show function included in the presentation software is turned on.

The input device 7 is a device to receive an instruction input with respect to various kinds of information. For example, when the display device 5 is mounted as a projector, a laser pointer that points a position on a slide projected on a screen can be mounted as the input device 7. That is, as the laser pointer, there is a laser pointer with a remote-control function to which pointer an operation unit such as various buttons to turn a page of a slide forward or backward are provided. The operation unit included in the laser pointer with a remote-control function can be used for an assist as the input device 7. Alternatively, a mouse or a keyboard can be employed as the input device 7 or an image sensor that inputs an image, in which a predetermined part of a screen or a presenter is imaged, to perform sensing of a position of a pointer pointed by the laser pointer or to perform detection of a line of sight of the presenter or recognition of a gesture thereof can be employed as the input device 7. Note that when the display device 5 is mounted as a liquid crystal display, a touch sensor attached on the liquid crystal display can be employed as the input device 7.

For example, this input device 7 receives designation of a document file to be executed by presentation software on the presentation supporting device 10 or operation to turn a page of a slide forward or backward. The operation received through the input device 7 in such a manner is output to the presentation supporting device 10.

The presentation supporting device 10 is a computer that executes the presentation software.

As an embodiment, an information processing device such as a desktop-type or laptop-type personal computer can be employed as the presentation supporting device 10. Alternatively, not only a fixed-type terminal such as the personal computer but also various mobile terminal devices can be employed as the presentation supporting device 10. Examples of the mobile terminal devices include mobile communication terminals such as a smartphone, a mobile phone, and a personal handyphone system (PHS) and personal digital assistants (PDA).

Note that in this embodiment, a case where the presentation supporting device 10 provides the presentation supporting service in a stand-alone manner to execute the presentation software independently without depending on an external resource is assumed as an example. A detail will be described later. However, the presentation supporting service is not necessarily provided in a stand-alone manner. For example, it is possible to build a client server system or a thin client system by providing a server, which provides the presentation supporting service, to a client to execute the presentation software.

Configuration of Presentation Supporting Device 10

Figure 2:
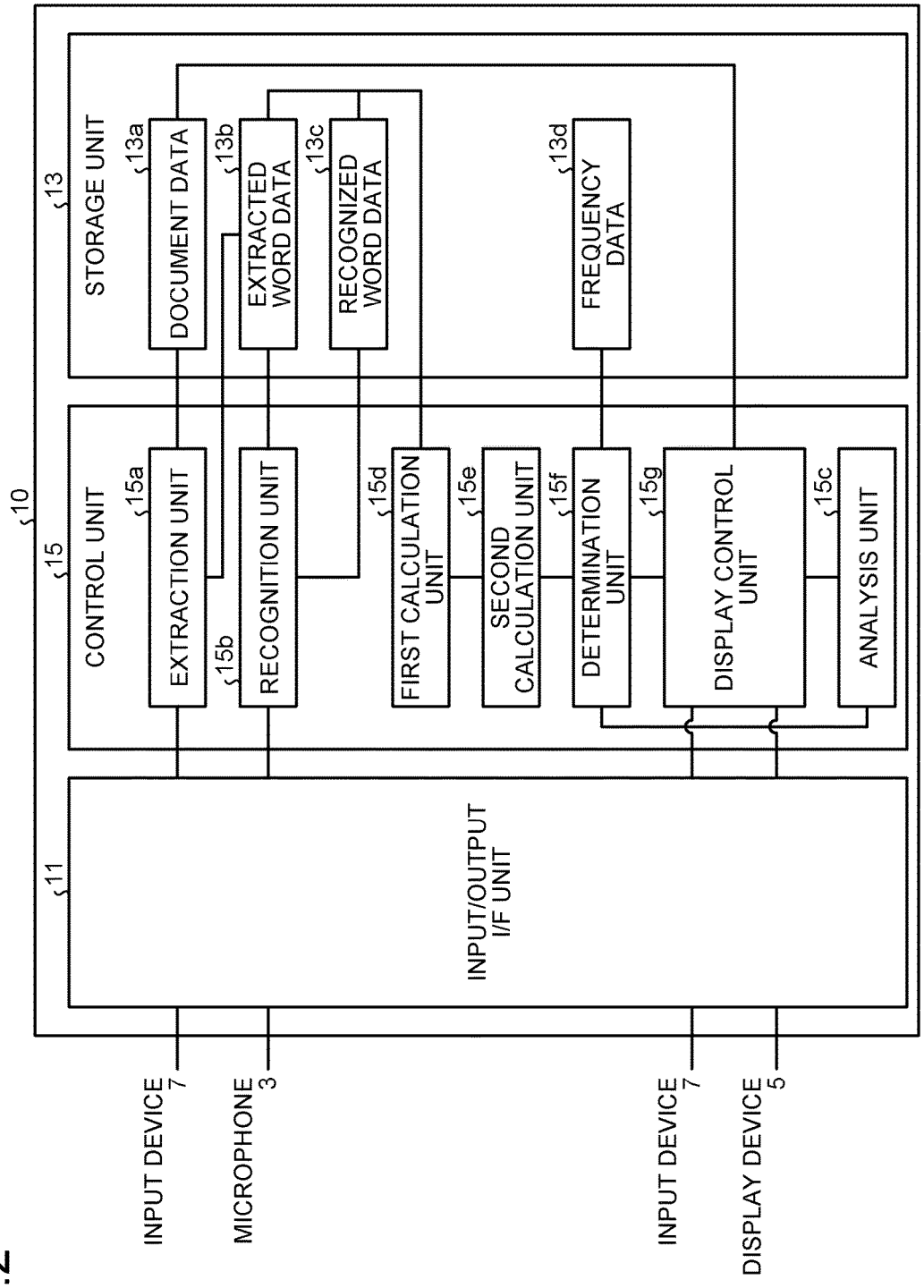
FIG. 2 is a block diagram illustrating a functional configuration of a presentation supporting device according to the first embodiment.

Then, a functional configuration of the presentation supporting device 10 according to the present embodiment will be described. FIG. 2 is a block diagram illustrating a functional configuration of the presentation supporting device 10 according to the first embodiment. As illustrated in FIG. 2, the presentation supporting device 10 includes an input/output interface (I/F) unit 11, a storage unit 13, and a control unit 15. Note that in FIG. 2, a solid line indicating a relationship in input/output of data is illustrated. However, in FIG. 2, only a minimum part is illustrated for convenience of description. That is, input/output of data related to each processing unit is not limited to the illustrated example. Input/output of data, which is not illustrated in the drawing, such as input/output of data between a processing unit and a processing unit, a processing unit and data, and a processing unit and an external device can be performed.

The input/output I/F unit 11 is an interface to perform input/output with respect to the peripheral equipment such as the microphone 3, the display device 5, and the input device 7.

As an embodiment, the input/output I/F unit 11 outputs, to the control unit 15, various kinds of operation input from the operation input device 7. Also, the input/output I/F unit 11 outputs image data of a slide, which data is output from the control unit 15, to the display device 5 or outputs a highlight instruction with respect to a region included in a slide or a cancelation instruction thereof to the display device 5. Also, the input/output I/F unit 11 outputs sound data input from the microphone 3 to the control unit 15.

The storage unit 13 is a device that stores data used for an operating system (OS) or presentation software executed by the control unit 15 or various programs such as an application program.

As an embodiment, the storage unit 13 is mounted as a main storage device in the presentation supporting device 10. For example, as the storage unit 13, various semiconductor memory elements such as a random access memory (RAM) or a flash memory can be employed. The storage unit 13 can be also mounted as an auxiliary storage device. In this case, a hard disk drive (HDD), an optical disk, a solid state drive (SSD) or the like can be employed.

The storage unit 13 stores document data 13a, extracted word data 13b, recognized word data 13c, and frequency data 13d as examples of data used for a program executed in the control unit 15. Note that the extracted word data 13b, the recognized word data 13c, and the frequency data 13d that are other than the document data 13a will be described in a description of the control unit 15. Also, the storage unit 13 can store different electronic data such as definition data, which is related to a highlight display, other than the data described above.

The document data 13a is data related to a document.

As an embodiment, a document file in which one or more slides are created by using the presentation software can be employed as the document data 13a. Into each slide, content such as a text or figure created by a different application program can be imported. For example, it is possible to import a document created by word-processing software, a chart or a graph created by spreadsheet software, an image or video imaged by an imaging device, or an image or video edited by image editing software. In such a manner, in order to realize a keyword search by sound recognition, to content other than a text, meta-information including a character string such as a description term or a description sentence of the content can be assigned until presentation is started.

The control unit 15 includes an inner memory to store various programs or control data and executes various kinds of processing with these.

As an embodiment, the control unit 15 is mounted as a central processing unit (CPU). Note that the control unit 15 is not necessarily mounted as the central processing unit and may be mounted as a micro processing unit (MPU) or a digital signal processor (DSP). Also, the control unit 15 can be realized by a hardwired logic such as an application specific integrated circuit (ASIC) or a field programmable gate array (FPGA).

The control unit 15 virtually realizes the following processing unit by executing various programs. For example, as illustrated in FIG. 2, the control unit 15 includes an extraction unit 15a, a recognition unit 15b, an analysis unit 15c, a first calculation unit 15d, a second calculation unit 15e, a determination unit 15f, and a display control unit 15g.

The extraction unit 15a is a processing unit that extracts, as the extracted word data 13b, a word to be registered into dictionary data, which is used in sound recognition, from a slide included in a document file.

As an embodiment, the extraction unit 15a can automatically start processing to extract the extracted word data 13b or can start the processing according to manual setting. For example, in a case of starting the processing automatically, processing can be started when a document file is stored into the storage unit 13 and closed by the presentation software or when a document file is stored into the storage unit 13 during editing of the document file through presentation. Also, in a case of starting the processing according to manual setting, the processing can be started when an instruction to execute preprocessing of presentation is received through the input device 7. In either case, processing is started when a document file corresponding to an instruction for saving or executing is read among document files included in the document data 13a stored in the storage unit 13.

Generation of the extracted word data 13b will be described. The extraction unit 15a reads a saved document file or a document file, an instruction to execute preprocessing of presentation is received with respect to which file, among document files included in the document data 13a stored in the storage unit 13. Here, a case where the extraction unit 15a reads a document file from the storage unit 13 has been described as an example. However, where a document file is acquired is not limited to this. For example, the extraction unit 15a can acquire a document file from an auxiliary storage device such as a hard disk or an optical disk or a removable medium such as a memory card or a universal serial bus (USB) memory. Also, the extraction unit 15a can acquire a document file by receiving the file from an external device through a network.

Then, the extraction unit 15a divides a slide included in the read document file into a plurality of regions. For example, the extraction unit 15a divides the slide in a unit of a sentence, a line, or a paragraph. In this case, the extraction unit 15a scans a character string included in the slide, detects a delimiter corresponding to a space, a period, or a line break, and sets the delimiter as a boundary of a region. The extraction unit 15a divides a character string, which is included in the slide, at the boundary. Accordingly, the slide is divided into a plurality of regions at each delimiter. Then, the extraction unit 15a assigns, to each region acquired by the division of the slide, an index to identify the region. Note that, here, a case where a slide is automatically divided has been described as an example. However, a slide may be divided according to manual setting by designation of a boundary of a region through the input device 7 or the like.

After the division of the slide, the extraction unit 15a selects one of a plurality of regions included in the slide. Then, the extraction unit 15a extracts a word and a pronunciation of the word by executing natural language processing with respect to a character string included in the selected region. For example, the extraction unit 15a extracts a noun word and a pronunciation of the word among a morpheme acquired by execution of a morpheme analysis of a character string in the region. Then, the extraction unit 15a repeatedly executes extraction of a word and a pronunciation of the word until all regions included in the slide are selected. Then, the extraction unit 15a registers, into the storage unit 13, extracted word data 13b to which the word, the pronunciation of the word, and an index of a region including the word are associated.

After the division of the slide, the extraction unit 15a selects one of a plurality of regions included in the slide. Then, the extraction unit 15a extracts a word by executing the natural language processing with respect to the character string included in the selected region. For example, the extraction unit 15a extracts a noun word or a word forming a phrase among a morpheme acquired by execution of a morpheme analysis of a character string in the region. Then, the extraction unit 15a assigns, to each of the extracted words, an index assigned to a region including the word. Subsequently, the extraction unit 15a repeatedly executes extraction of a word and assignment of an index until all regions included in the slide are selected.

After words are extracted from all the regions in such a manner, the extraction unit 15a calculates the number of times of appearance of each word k, which is included in the slide, in the document. For example, the number of times of appearance in the document is calculated by counting the number of times of appearance of the word k in the document. Then, the extraction unit 15a registers, into the storage unit 13, extracted word data 13b to which the word k, an index idx and the number of times of appearance of the word k in the document are associated.

The recognition unit 15b is a processing unit that executes sound recognition.

As an embodiment, the recognition unit 15b is activated when an instruction to start presentation is received in a state, in which a document file is opened by the presentation software, and waits until a sound signal of a predetermined time length is input from the microphone 3. For example, waiting for an input of a sound signal of a time length of at least one frame such as 10 msec is performed. Then, each time a sound signal of a predetermined time length is input from the microphone 3, the recognition unit 15b executes sound recognition such as word spotting with respect to the sound signal. Here, the recognition unit 15b applies, to the word spotting, extracted word data 13b related to a slide which is included in a document file currently executed by the presentation software and which is currently displayed on the display device 5 among the extracted word data 13b stored in the storage unit 13. Accordingly, the recognition unit 15b recognizes whether a word extracted from each region included in the currently-displayed slide is in a speech by a presenter. When a pronunciation of a word is recognized from a sound signal, the recognition unit 15b registers, into the storage unit 13, recognized word data 13c to which the word and time of recognition of the word are associated. Note that when the same word is recognized for a plurality of times as time elapses, time at which the word is recognized last, that is, the latest recognition time is registered into the storage unit 13.

Then, the recognition unit 15b determines whether there is a word, a period elapsed after which word is registered into the storage unit 13 reaches a predetermined period, in the recognized word data 13c stored in the storage unit 13. For example, with respect to each word included in the recognized word data 13c, the recognition unit 15b determines whether a difference between time registered in association with the word and time at which the recognition unit 15b refers to the recognized word data 13c, that is, current time exceeds a predetermined threshold. Here, the recognition unit 15b can change a threshold used for the determination according to a unit of division of a slide such as a sentence, line, or paragraph. For example, when a slide is divided in a unit of a line, it can be assumed that the number of characters read in one region is about 20 to 30 characters. In this case, as an example of the threshold, reading out time can be calculated based on an average speed of reading out in description sound, which speed is seven beat/second to eight beat/second, and three seconds can be used. Also, when the slide is divided in a unit of a paragraph, it can be assumed that reading out takes a period longer than that in the unit of a line. In this case, (the number of lines ×3) seconds can be used as an example of the threshold.

Here, when there is a word a period elapsed after which word is registered into the storage unit 13 reaches a predetermined period such as three seconds, it becomes more likely that a description related to a region, which includes the word, in a slide is over. When such a word is left, possibility that an already-described region is displayed in a highlight is increased. Thus, the recognition unit 15b deletes a record related to the word from the recognized word data 13c stored in the storage unit 13. On the other hand, when there is no word a period elapsed after which word is registered into the storage unit 13 reaches a predetermined period, possibility that a description related to a region in a slide in which a word included in the recognized word data 13c appears is not over yet is increased. In this case, possibility that an already-described region is displayed in a highlight is low. Thus, the recognition unit 15b does not delete the word included in the recognized word data 13c stored in the storage unit 13 and leaves the word.

Also, the recognition unit 15b determines whether a page of a slide displayed on the display device 5 is changed. For example, the recognition unit 15b determines whether a slide is switched in a slide show or operation to turn a page of a slide forward or backward is received through the input device 7. Here, when a page of the slide displayed on the display device 5 is changed, a description by a presenter is likely to be changed from a slide of a page before the change to a slide of a page after the change. In this case, the recognition unit 15b deletes the recognized word data 13c stored in the storage unit 13. On the other hand, when a page of the slide displayed on the display device 5 is not changed, it is likely that a page described by the presenter is not changed. In this case, the recognition unit 15b does not delete the word included in the recognized word data 13c stored in the storage unit 13 and leaves the word.

By a series of these operations, the recognition unit 15b recognizes a word which is likely to be currently described by the presenter in a currently-displayed slide. In the following, there is a case where a word included in the extracted word data 13b is referred to as an "extracted word" and a word included in the recognized word data 13c is referred to as a "recognized word" and labels of the two are distinguished from each other.

The analysis unit 15c is a processing unit that analyzes a layout of a document file.

As an embodiment, in a case where a page of the slide displayed on the display device 5 is changed, the analysis unit 15c starts analyzing a layout in the slide after the change. For example, the analysis unit 15c calculates an area of a text box included in the slide and an area of content, which is included in the slide and which is other than the text box, such as a figure, a still image, and a video. Then, when determining that a proportion of an area of the text box included in the slide is equal to or greater than a predetermined value, the analysis unit 15c determines that a layout type of the slide is "text." Also, when a proportion of the content which is included in the slide and which is other than the text box is equal to or greater than a predetermined value, the analysis unit 15c determines that a layout type of the slide is a "figure." Also, when a proportion of an area of the text box included in the slide is less than a predetermined value and a proportion of the content which is included in the slide and which is other than the text box is less than a predetermined value, the analysis unit 15c determines that a layout type of the slide is "mixed."

The first calculation unit 15d is a processing unit that calculates, with respect to each region in a currently-displayed slide, a score from a recognized word included in the region.

As an embodiment, the first calculation unit 15d selects one of indexes of regions included in a slide currently displayed on the display device 5. Successively, the first calculation unit 15d extracts a recognized word included in a region with the selected index among recognized words included in the recognized word data 13c. Here, it is possible to acquire the number of times of appearance of a word k in the document with reference to the extracted word data 13b. Then, the first calculation unit 15d calculates a word score s (x) of the recognized word x by using the number of times of appearance of a recognized word x in a document f (x), the number of morae m of the recognized word x (x), certainty of a recognition result c (x). Here, "certainty" indicates how similar a recognition result is to a spectrum of each phoneme included in a standard model of a word and a value thereof becomes 1.0 in a case of an exact match.

More specifically, the first calculation unit 15d calculates a word score s (x) of the recognized word x by assigning parameters such as the number of times of appearance of a recognized word x in a document f (x), the number of morae m of x (x), and the certainty c of a recognition result (x) into the following equation (1). Here, min (a, b) indicates a function to output smaller one of a and b. Also, M is a constant number and is, for example, 6. Then, the first calculation unit 15d calculates a word score s (x) of each recognized word included in a region and calculates a highlight score S (d) by adding up the word scores of all recognized words. Note that in the above equation (1), an example in which three parameters of the number of times of appearance of a recognized word x in a document f (x), the number of morae m of the recognized word x (x), and the certainty c of a recognition result c (x) are used to calculate the word score s (x) of the recognized word x has been described. However, only an arbitrary one of these parameters may be used. Also, a calculation method is not limited to this.

$$s(x)=1/f(x)\times\min(1.0,m(x)/M)\times c(x) \qquad (1)$$

The second calculation unit 15e is a processing unit that calculates a distance between regions included in a currently-displayed slide.

As an embodiment, the second calculation unit 15e determines whether the highest score among highlight scores respectively calculated for regions by the first calculation unit 15d is equal to or higher than a predetermined threshold Th1 such as "2." Here, when the highest score is equal to or higher than the threshold Th1, the second calculation unit 15e further determines whether a highlight display is currently executed. When the highlight display is currently executed, the second calculation unit 15e determines whether an index of a region in which the highest score is calculated by the first calculation unit 15d is identical to an index of a region in which a highlight display is currently executed. Note that when the highest score is lower than the threshold Th1, that is, when the highlight display is not currently executed or when a region with the highest score is not changed from the previous time, the highlight display is not performed from the beginning or transition is not performed even in a case where a highlight display is performed. Thus, the distance between regions is not always calculated.

Here, when a region in which the highest score is calculated by the first calculation unit 15d is different from the region in which the highlight display is currently executed, the second calculation unit 15e calculates a distance between the two regions.

Figure 3:
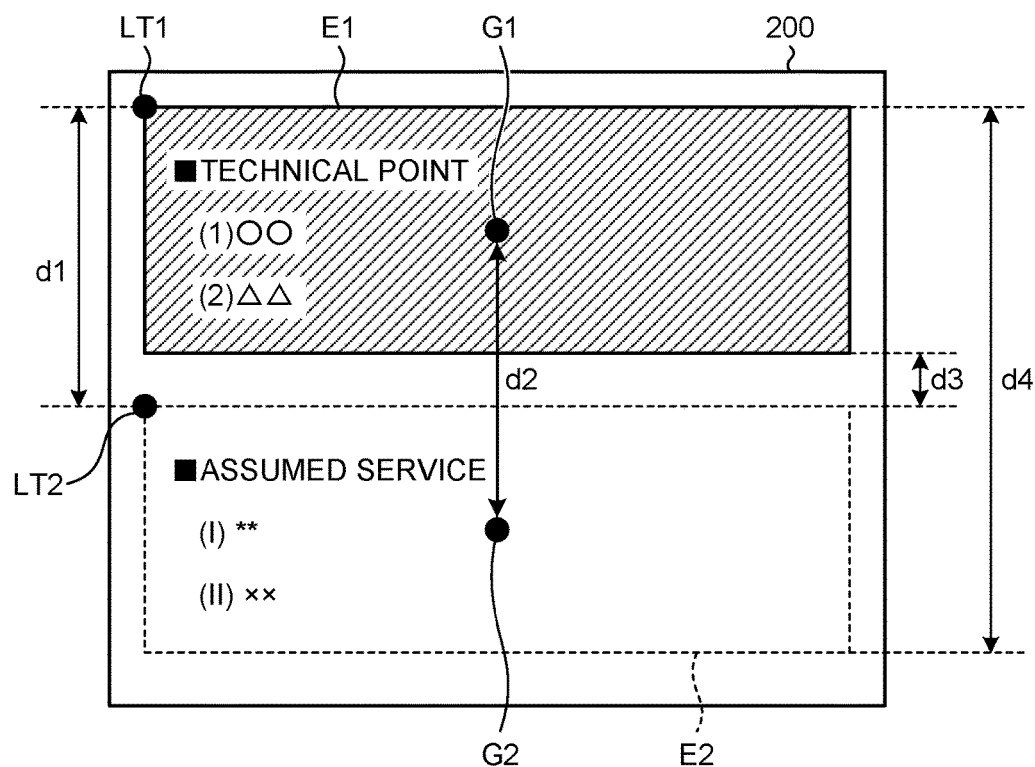
FIG. 3 is a view illustrating an example of a calculation method of a distance between regions.

FIG. 3 is a view illustrating an example of a calculation method of a distance between regions. In FIG. 3, a horizontal slide 200 a layout type of which is "text" is illustrated as an example. The slide 200 includes a region E1 including a header item a "technical point," an itemization of (1) "○○," and an itemization of (2) "△△" and a region E2 including a header item an "assumed service," an itemization of (I) "★★," and an itemization of (II) "xx." Note that here, a case where a distance is calculated with a positive sign when a moving direction of a highlight display is from an upper side toward a lower side of a slide, and is calculated with a negative sign when a moving direction of the highlight display is from the lower side toward the upper side of the slide.

For example, the second calculation unit 15e calculates a distance d1 between coordinates of a left vertex LT1 in the region E1 and coordinates of a left vertex LT2 in the region E2. Also, the second calculation unit 15e can calculate a distance d2 between coordinates of the center of gravity G1 of the region E1 and coordinates of the center of gravity G2 of the region E2. Moreover, the second calculation unit 15e can calculate a difference in a vertical direction between a lower end in the region E1 and an upper end in the region E2 as a distance d3. Also, the second calculation unit 15e can calculate a difference in the vertical direction between an upper end in the region E1 and a lower end in the region E2 as a distance d4. Although not illustrated, the second calculation unit 15e can calculate a length of the shortest straight line that connects the region E1 and the region E2 as a distance d5. A statistical value of one or more of these distances d1 to d5 is calculated as a distance d between regions.

Then, when a region in which the highest score is calculated by the first calculation unit 15d is the region E1 and a region in which a highlight display is currently executed is the region E2, the second calculation unit 15e assigns a positive sign to the distance d. When a region in which a highlight display is currently executed is the region E1 and a region in which the highest score is calculated by the first calculation unit 15d is the region E2, a negative sign is assigned to the distance d. Also, the second calculation unit 15e normalizes the calculated distance d between the region E1 and the region E2. For example, a distance in a case of moving from a top end to a bottom end of a slide is set as "1," a distance in a case of moving from the bottom end to the top end of the slide is set as "−1," and a distance d normalized as a value from −1 to 1 is calculated.

The determination unit 15f is a processing unit that determines a region where a highlight display is performed.

As an embodiment, the determination unit 15f determines a region, where a highlight display is performed, in the following manner when there is a region having a highlight score equal to or higher than the threshold Th1 among highlight scores calculated by the first calculation unit 15d. For example, when a highlight display is not currently executed, the determination unit 15f determines to execute a highlight display related to a region with the highest score. On the other hand, when a highlight display is currently executed and in a case where a region in which the highest score is calculated by the first calculation unit 15d is the same with a region in which the highlight display is currently executed, the determination unit 15f keeps the currently-executed highlight display.

Here, in a case where a region in which the highest score is calculated by the first calculation unit 15d and a region in which the highlight display is currently executed are different from each other, the determination unit 15f a derives a layout type of a currently-displayed slide analyzed by the analysis unit 15c and a transition frequency of a highlight display corresponding to a distance between regions calculated by the second calculation unit 15e with reference to frequency data to which a distance between regions and a frequency of transition of a highlight display are associated with respect to each layout type.

Figure 4:
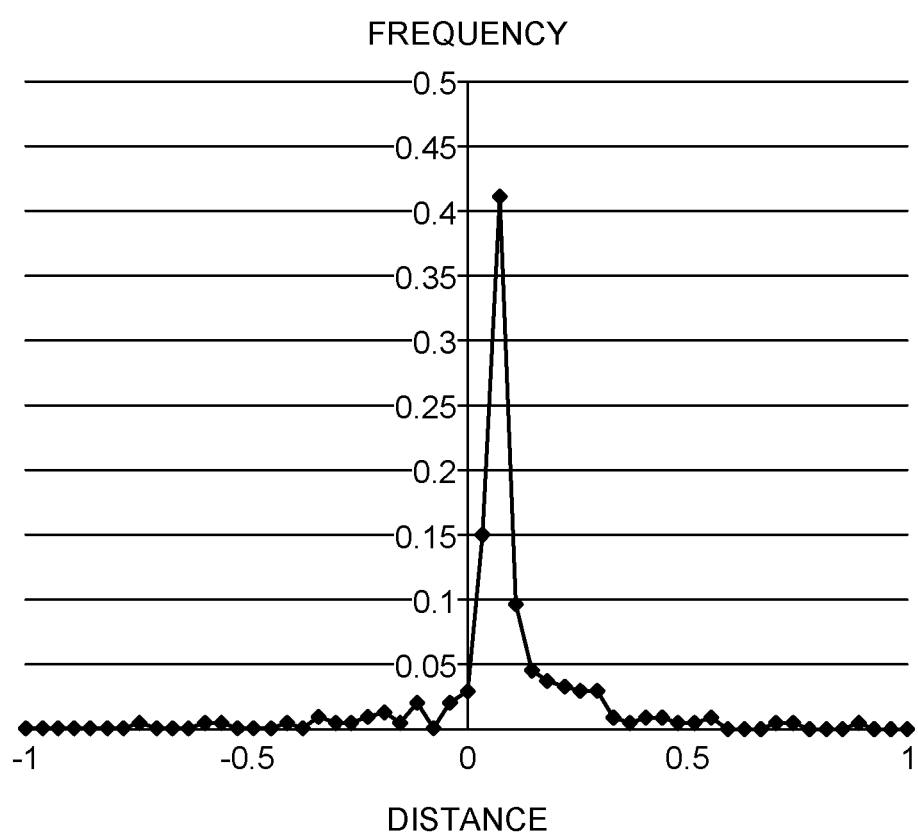
FIG. 4 is a graph illustrating an example of frequency data.

FIG. 4 is a graph illustrating an example of frequency data 13d. In FIG. 4, frequency data 13d of when a layout type is "text" is illustrated. A horizontal axis in the graph illustrated in FIG. 4 indicates a distance between regions and is normalized as a value from −1 to 1 with a distance in a case of moving from the top end to the bottom end of a slide as "1" and a distance in a case of moving from the bottom end to the top end of the slide as "−1." Also, a vertical axis indicates a frequency of transition of a highlight display. As illustrated in FIG. 4, the frequency data 13d is data indicating a distribution condition of a transition frequency of the highlight display. According to the frequency data 13d, when a layout type is "text," about 82% of transition of a highlight display is in a distance equal to or shorter than ⅕ of the entire slide and about 96% thereof is in a distance equal to or shorter than a half of the entire slide. For example, such frequency data 13d is acquired by performance of a previous experiment or investigation with the following as conditions. That is, transition of a highlight display is performed according to correct data without false recognition, transition of a highlight display is counted for more than the predetermined number of times, and the like. Note that in FIG. 4, a distribution condition of a frequency of when a layout type is "text" is illustrated. However, actually, it is assumed that a distribution condition of a frequency of when the layout type is "figure" and a distribution condition of a frequency of when the layout type is "mixed" are also stored in the storage unit 13.

After a transition frequency of a highlight display is derived in such a manner, the determination unit 15f determines whether the transition frequency of the highlight display is lower than a predetermined threshold Th2 such as 0.1. Here, when the transition frequency of the highlight display exceeds the threshold Th2, the determination unit 15f performs transition of the highlight display from the region in which the highlight display is currently executed to a region in which the highest score is calculated by the first calculation unit 15d. On the other hand, when the transition frequency of the highlight display is lower than the threshold Th2, there is a possibility that transition to an incorrect region is performed due to false recognition. Thus, the determination unit 15f determines whether a frequency of the highest score calculated by the first calculation unit 15d becoming equal to or higher than the threshold Th1 is equal to or higher than a predetermined threshold Th3 such as twice in five seconds.

Here, when the frequency of the highest score becoming equal to or higher than the threshold Th1 is equal to or higher than the threshold Th3, it is possible to assume that a possibility of making false recognition becomes less. Thus, transition of the highlight display to a region with a low transition frequency is performed. In this case, the determination unit 15f performs transition of the highlight display from the region in which the highlight display is currently executed to the region in which the highest score is calculated by the first calculation unit 15d. On the other hand, when the frequency of the highest score becoming equal to or higher than the threshold Th1 is lower than the threshold Th3, transition of the highlight display may be performed due to false recognition. In this case, the determination unit 15f holds transition of the highlight display and keeps the currently-executed highlight display.

Note that here, a case where a frequency of the highest score, which is calculated by the first calculation unit 15d, becoming equal to or higher than the threshold Th1 is calculated when a transition frequency of the highlight display is lower than the threshold Th2 has been described as an example. However, it is possible to determine whether a period from when the highest score is previously determined to be equal to or higher than the threshold Th1 until when the highest score is determined to be equal to or higher than the threshold Th1 this time is a predetermined period such as three seconds.

The display control unit 15g is a processing unit that executes display control with respect to the display device 5.

As an embodiment, the display control unit 15g displays a slide included in a document file onto the display device 5 when the document file is opened by the presentation software. Here, the display control unit 15g may display a slide of the first page among slides included in the document file or may display a slide of a page which is edited the most recently. Then, the display control unit 15g executes a highlight display related to a region determined by the determination unit 15f or cancels the highlight display according to an instruction from the determination unit 15f. Here, the "highlight display" means not only a narrowly-defined highlight display, that is, display control of making a background color brighter or inverted but also a widely-defined highlight display. For example, a general highlighting display such as highlighting of a filled region or highlighting of a font (font size, underline, or italic type) can be arbitrarily executed.

Also, when an instruction to switch a page is received through the input device 7, the display control unit 15g changes a slide to be displayed on the display device 5. For example, in a case of receiving operation of turning a page forward, the display control unit 15g displays a slide of a next page of a currently-displayed slide onto the display device 5. Also, in a case of receiving operation of turning a page backward, the display control unit 15g displays a slide of a previous page of the currently-displayed slide onto the display device 5.

Flow of Processing

Next, a flow of processing of the presentation supporting device 10 according to the present embodiment will be described. Note that (1) generation processing of extracted word data, (2) sound recognition processing, and (3) display control processing of a highlight which are executed by the presentation supporting device 10 will be described in this order.

(1) Generation Processing of Extracted Word Data

Figure 5:
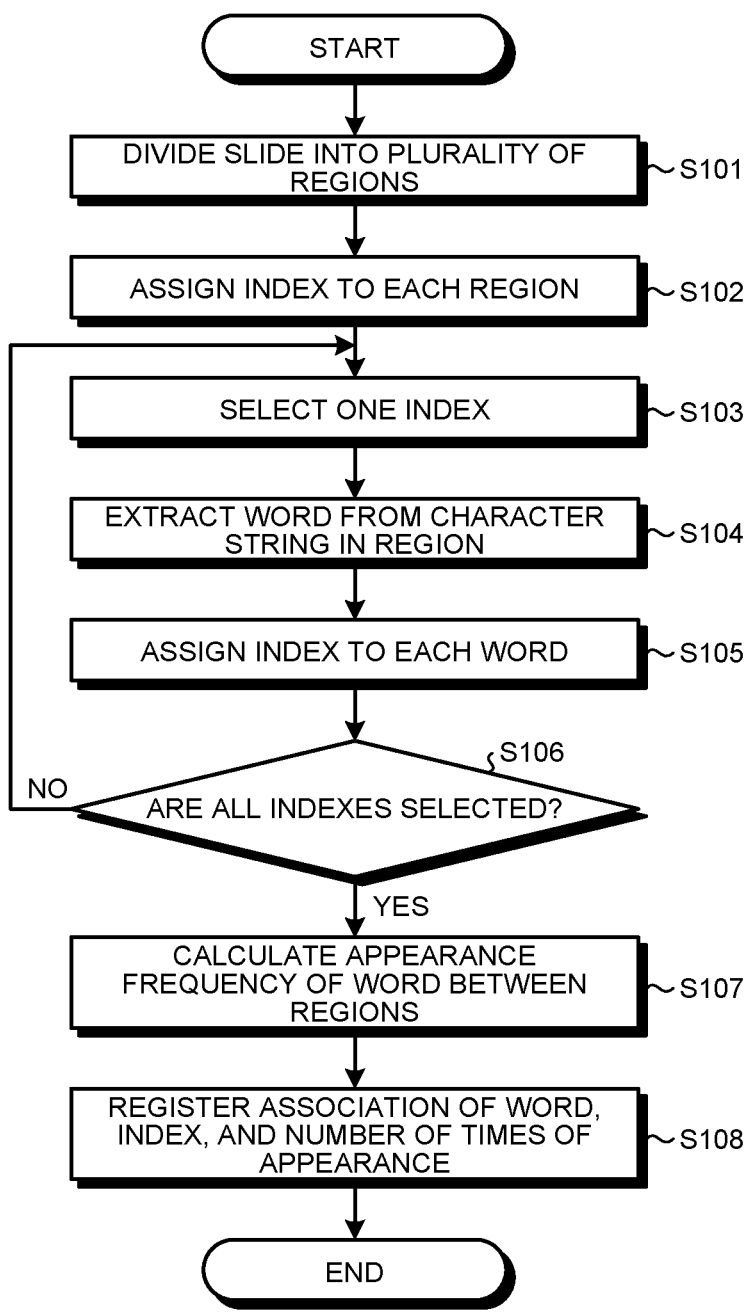
FIG. 5 is a flowchart illustrating a procedure of generation processing of extracted word data according to the first embodiment.

FIG. 5 is a flowchart illustrating a procedure of generation processing of extracted word data according to the first embodiment. This processing can be started automatically or according to manual setting. For example, in a case of starting the processing automatically, processing can be started when a document file is stored into the storage unit 13 and closed by the presentation software or when a document file is stored into the storage unit 13 during editing of the document file through presentation. Also, in a case of starting the processing according to manual setting, the processing can be started when an instruction to execute preprocessing of presentation is received through the input device 7. In either case, processing is started when a document file corresponding to an instruction for saving or executing is read among document files included in the document data 13a stored in the storage unit 13.

As illustrated in FIG. 5, the extraction unit 15a divides a slide included in the document file into a plurality of regions in a unit of a sentence, a line, or a paragraph (step S101). Successively, the extraction unit 15a assigns, to each region acquired in step S101, an index for identification of the region (step S102).

Then, the extraction unit 15a selects one of the indexes assigned in step S102 (step S103). Subsequently, the extraction unit 15a extracts a noun word from a morpheme acquired by execution of a morpheme analysis on a character string in a region with the index selected in step S103 (step S104). Then, the extraction unit 15a assigns, to each word extracted in step S104, an index assigned to a region including the word (step S105).

Until all indexes assigned in step S102 are selected (step S106 No), the extraction unit 15a repeatedly executes processing from step S103 to step S105.

Then, when all of indexes assigned in step S102 are selected (step S106 Yes), the extraction unit 15a calculates an appearance frequency $f_k$ of each word k included in the slide (step S107). Then, the extraction unit 15a registers extracted word data 13b, to which the word k, the index idx, and the appearance frequency $f_k$ are associated, into the storage unit 13 (step S108) and ends the processing.

(2) Sound Recognition Processing

Figure 6:
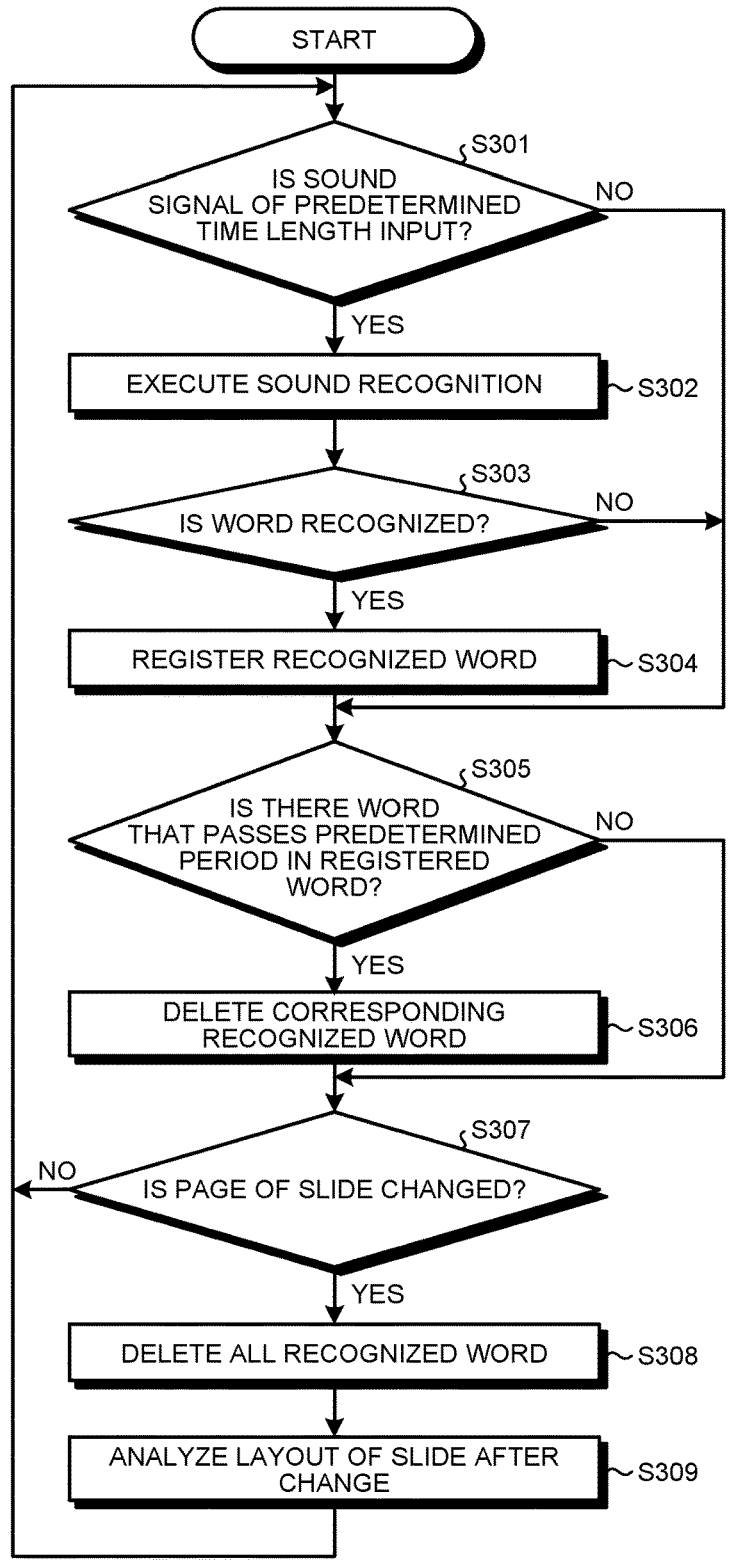
FIG. 6 is a flowchart illustrating a procedure of sound recognition processing according to the first embodiment.

FIG. 6 is a flowchart illustrating a procedure of sound recognition processing according to the first embodiment. This processing is activated when an instruction of starting presentation is received in a state, in which the document file is opened by the presentation software, and is repeatedly executed until an instruction of ending the presentation is received.

As illustrated in FIG. 6, the recognition unit 15b waits until a sound signal of a predetermined time length which is, for example, at least one frame such as 10 msec is input from the microphone 3 (step S301).

Then, when a sound signal of a predetermined time length is input from the microphone 3 (step S301 Yes), the recognition unit 15b executes sound recognition such as word spotting on the sound signal (step S302). When word spotting is executed in step S302, extracted word data related to a slide, which is a slide included in a document file currently executed in the presentation software and which is currently displayed on the display device 5, among the extracted word data 13b stored in the storage unit 13 is applied as dictionary data.

Here, when a word is recognized in the sound signal (step S303 Yes), the recognition unit 15b registers recognized word data 13c, to which the word recognized in step S302 and time of recognition of the word are associated, into the storage unit 13 (step S304) and goes to processing in step S305.

On the other hand, when a sound signal of a predetermined time length is not input from the microphone 3 or when a word is not recognized in the sound signal (step S301 No or step S303 No), processing thereafter is skipped and processing goes to that in step S305.

Here, the recognition unit 15b determines whether there is a word, a period elapsed after which word is registered into the storage unit 13 reaches a predetermined period, in the recognized word data 13c stored in the storage unit 13 (step S305). When there is a word a period elapsed after which word is registered into the storage unit 13 reaches a predetermined period (step S305 Yes), the recognition unit 15b deletes a record related to the word from the recognized word data 13c stored in the storage unit 13 (step S306). Note that when there is no word a period elapsed after which word is registered into the storage unit 13 reaches a predetermined period (step S305 No), processing in step S306 is skipped and processing goes to that in step S307.

Then, the recognition unit 15b determines whether a page of a slide displayed on the display device 5 is changed (step S307). Here, when a page of the slide displayed on the display device 5 is changed (step S307 Yes), the recognition unit 15b deletes the recognized word data 13c stored in the storage unit 13 (step S308). Moreover, the analysis unit 15c analyzes a layout of a slide displayed on the display device 5 (step S309). A layout type of the slide analyzed in such a manner is registered into a work area of an internal memory referred to by the determination unit 15f.

Then, the processing goes back to that in step S301 and the processing in and after step S301 is repeatedly executed. Note that when a page of the slide displayed on the display device 5 is not changed (step S307 No), processing in step S308 is not executed and the processing goes back to that in step S301.

(3) Display Control Processing of Highlight

Figure 7:
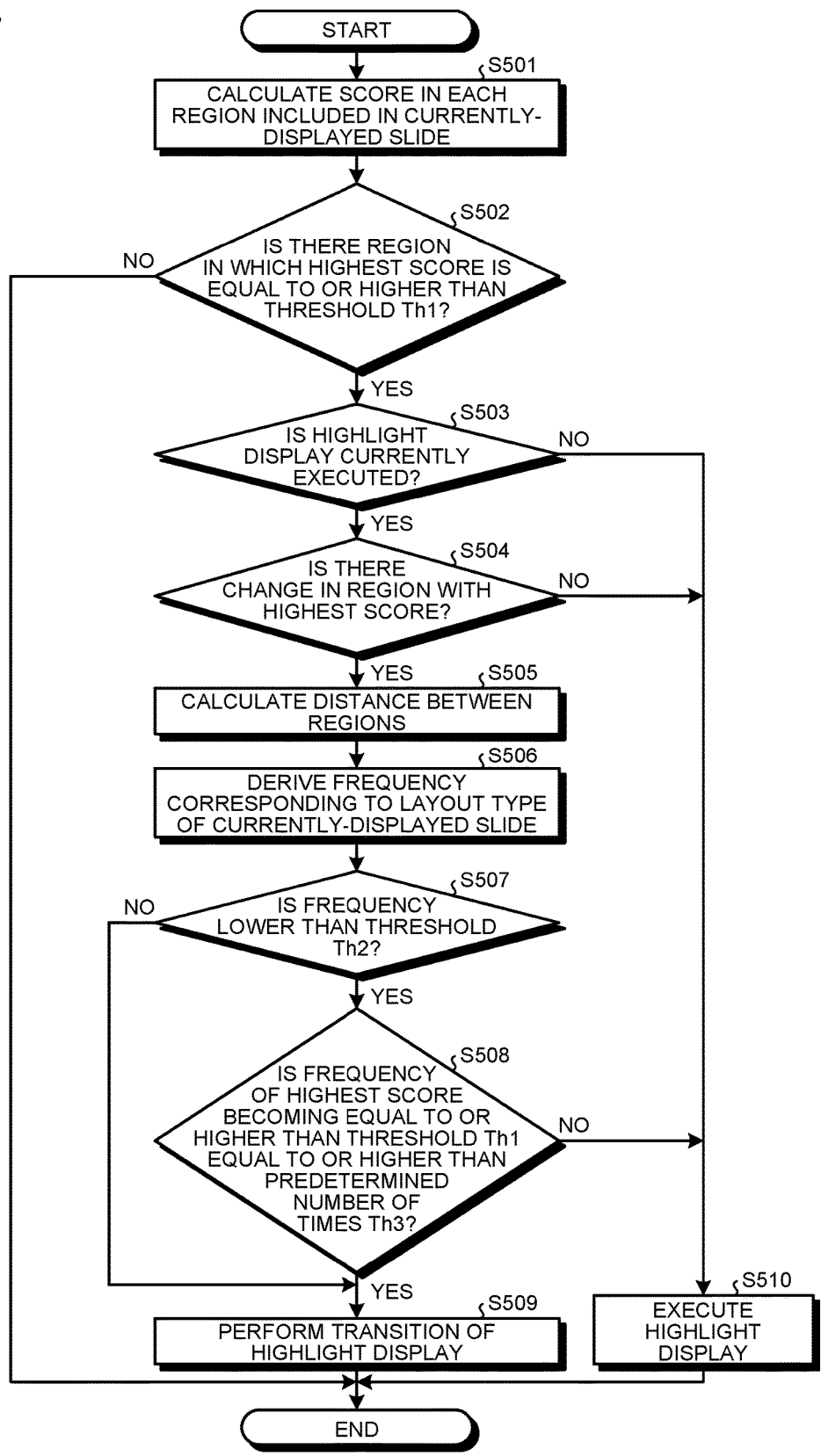
FIG. 7 is a flowchart illustrating a procedure of display control processing of a highlight according to the first embodiment.

FIG. 7 is a flowchart illustrating a procedure of display control processing of a highlight according to the first embodiment. This processing is processing executed along with the sound recognition processing illustrated in FIG. 6. Also, this processing is started when an instruction of starting presentation is received in a state in which a document file is opened by presentation software and is repeatedly executed until an instruction of ending the presentation is received. Note that a period of repeatedly executing the processing may be similar to that in the sound recognition processing illustrated in FIG. 6 or different therefrom. Also, the processing may be executed in a manner synchronous with the sound recognition processing illustrated in FIG. 6 or in an asynchronous manner.

As illustrated in FIG. 7, the first calculation unit 15d calculates a highlight score of each region included in a currently-displayed slide (step S501). Then, the second calculation unit 15e determines whether the highest score among highlight scores respectively calculated by the second calculation unit 15e for regions is equal to or higher than the threshold Th1 (step S502).

Here, when the highest score is lower than the threshold Th1 (step S502 No) the processing is ended.

On the other hand, when the highest score is equal to or higher than the threshold Th1 (step S502 Yes), the second calculation unit 15e further determines whether a highlight display is currently executed (step S503). When the highlight display is not currently executed (step S503 No), the determination unit 15f determines to execute a highlight display related to a region with the highest score (step S510) and ends the processing.

Here, when the highlight display is currently executed (step S503 Yes), the second calculation unit 15e determines whether an index of the region in which the highest score is calculated in step S501 is identical to an index of the region in which the highlight display is currently-executed (step S504). Note that when the region in which the highest score is calculated in step S501 is identical to the region in which the highlight display is currently-executed (step S504 No), the determination unit 15f keeps the currently-executed highlight display (step S510) and ends the processing.

Here, when the region in which the highest score is calculated in step S501 is different from the region in which the highlight display is currently executed (step S504 Yes), the second calculation unit 15e calculates a distance between the two regions (step S505).

Then, with reference to the frequency data 13d, the determination unit 15f derives a layout type of a currently-displayed slide analyzed in step S309 illustrated in FIG. 6 and a transition frequency of a highlight display corresponding to the distance between regions calculated in step S505 (step S506).

Then, the determination unit 15f determines whether the transition frequency of the highlight display is lower than the predetermined threshold Th2 (step S507). Here, when the transition frequency of the highlight display is lower than the threshold Th2 (step S507 Yes), there is a possibility that transition of the highlight display to a far region is performed due to false recognition. In this case, the determination unit 15f determine whether a frequency of the highest score calculated in step S501 becoming equal to or higher than the predetermined threshold Th1 is equal to or higher than the predetermined threshold Th3 (step S508).

Here, when the frequency of the highest score becoming equal to or higher than the threshold Th1 is equal to or higher than the threshold Th3 (step S508 Yes), it is possible to estimate that there is a less possibility of making false recognition although transition of the highlight display to a far region is performed. In this case, the determination unit 15f performs transition of the highlight display from the region in which the highlight display is currently executed to the region in which the highest score is calculated in step S501 (step S509). Then, the determination unit 15f ends the processing. On the other hand, when the frequency of the highest score becoming equal to or higher than the threshold Th1 is lower than the threshold Th3 (step S508 No), transition of the highlight display may be performed due to false recognition. In this case, the determination unit 15f holds transition of the highlight display and keeps the currently-executed highlight display (step S510) and ends the processing.

On the other hand, when the transition frequency of the highlight display exceeds the threshold Th2 (step S507 No), it is possible to assume that transition of the highlight display to a neighboring region is likely to be performed and flapping is not likely to be caused even when the transition of the highlight display is performed. In this case, the determination unit 15f performs transition of the highlight display from the region in which the highlight display is currently executed to the region in which the highest score is calculated by the first calculation unit 15d (step S509) and ends the processing.

One Aspect of Effect

As described above, when a frequency corresponding to a distance of transition of a region in which a highlight display is performed in a currently-displayed slide is lower than a threshold, the presentation supporting device 10 according to the present embodiment holds transition of the highlight display until a frequency of a score of sound recognition related to a region in a transition destination becoming equal to or higher than a threshold is increased. Accordingly, transition of a highlight display, in which transition the highlight display moves back to a part described by a presenter due to false recognition after moving away from the part described by the presenter, is controlled. Thus, it is possible to control flapping of a highlight display according to the presentation supporting device 10 according to the present embodiment.

[b] Second Embodiment

An embodiment related to the disclosed device has been described. However, the present invention can be executed in various different forms other than the above-described embodiment. Here, a different embodiment included in the present invention will be described.

Utilization of Angle

In the first embodiment, a case where a transition frequency of a highlight display is used as one of conditions to hold transition of the highlight display has been described as an example. However, a different parameter can be used as the condition. For example, a presentation supporting device 10 can use a change in an angle of a line of sight of a presenter or a listener before and after transition of a highlight display.

That is, at a place away from a focus point for a certain angle such as five degrees (around ¼ of screen), a sight of a listener is decreased to about 30% of that at a place of the focus point. That is, in a case where transition of a highlight display to a place away for more than five degrees is erroneously performed and when a line of sight of a listener also moves along with the highlight display, it is not possible for the listener to read an actual description part. Thus, for example, when transition of a highlight display to a position where a focus point of the listener moves for more than five degrees is performed, the presentation supporting device 10 can hold the transition of the highlight display until a frequency of the highest score becoming equal to or higher than a threshold Th1 becomes equal to or higher than a threshold Th3.

Figure 8:
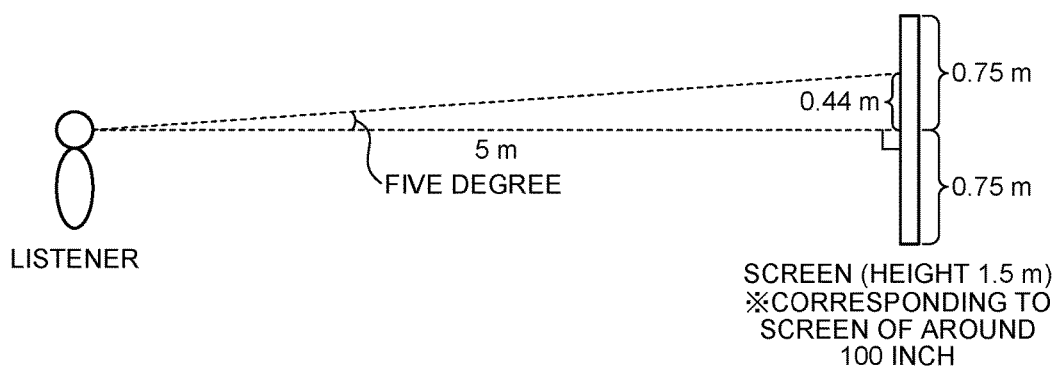
FIG. 8 is a view illustrating an example of an angle.

FIG. 8 is a view illustrating an example of an angle. In FIG. 8, a case where a listener sees a slide on a screen of a projector is illustrated. Also, in FIG. 8, a case where a 100-inch screen with the height of 1.5 m is arranged at a position away from the listener for five meters is assumed. As illustrated in FIG. 8, when a highlight display moves from a center in each of upper and lower ends of the screen to a position away for "0.44 m" in a surface direction of the screen such as in a vertical direction, a relationship of $\tan \theta \approx 0.44/5$ is established. Thus, it is possible to calculate an angle $\theta$ by using arctan which is an inverse function of tan and by performing a calculation of $\arctan (0.44/5)=\theta$. In such a manner, angle $\theta \approx 5°$ is calculated. In this case, for example, when a material is formed from 10 lines with characters of the same size and the same space between lines, a focus is moved for five degrees or more in a case where the highlight display moves for four lines or more. Thus, transition of the highlight display is held. Accordingly, it is possible to control movement of a line of sight of a listener along with erroneous transition of a highlight display when transition of the highlight display to a place away for five degrees or more is performed.

Figure 9:
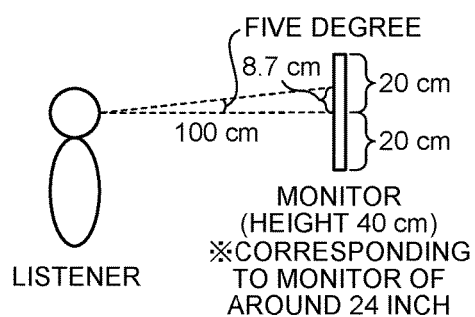
FIG. 9 is a view illustrating an example of an angle.

FIG. 9 is a view illustrating an example of an angle. In FIG. 9, a case where a listener browses a slide on a monitor is illustrated. Moreover, in FIG. 9, a case where a 24-inch screen with the height of 40 cm is arranged at a position away from the listener for 100 cm is assumed. As illustrated in FIG. 9, when a highlight display moves from a center in each of upper and lower ends of the screen to a position away for "8.7 cm" in a surface direction of the screen such as in a vertical direction, a relationship of $\tan \theta \approx 8.7/100$ is established. Thus, it is possible to calculate an angle $\theta$ by using arctan which is an inverse function of tan and by performing a calculation of $\arctan (8.7/100)=\theta$. In such a manner, angle $\theta \approx 5°$ is calculated. In this case, for example, when a material is formed from 10 lines with characters of the same size and the same space between lines, a highlight jumps for five degrees or more in a case where the highlight display moves for three lines or more. Thus, transition of the highlight display is held. Accordingly, it is possible to control movement of a line of sight of a listener along with erroneous transition of a highlight display when transition of the highlight display to a place away for five degrees or more is performed.

In such a manner, by using a size of a screen, a distance to a predetermined fixed point prescribed in a normal line direction of a display surface of the screen, and a distance between regions prescribed in a surface direction in parallel with the display surface of the screen, the presentation supporting device 10 calculates an angle of when a line of sight from the fixed point toward a region before transition of a highlight display changes to a line of sight toward a region after transition of the highlight display. Then, when the angle is equal to or larger than a predetermined threshold which is five degrees in the above example, the presentation supporting device 10 holds transition of the highlight display until the frequency of the highest score becoming equal to or higher than the threshold Th1 becomes equal to or higher than the threshold Th3.

First Application Example

In the first embodiment, a case where a highlight display of a region where the highest score is equal to or higher than the threshold Th1 is performed has been described as an example. However, the highlight display of the region is not necessarily performed even when the highest score is equal to or higher than the threshold Th1. For example when the highest score is equal to or higher than the threshold Th1 and the highest score calculated by the first calculation unit 15d is higher than highlight scores in all the other sections for predetermined times such as 1.2 times, a highlight display of a region in which the highest score is equal to or higher than the threshold Th1 may be performed. The highlight display may not be performed when the predetermined times are not reached. Accordingly, it is possible to control an error in association in a case where there is a region having a highlight score with a slight difference.

Second Application Example

In the first embodiment, a case where a highlight display of a region in which the highest score is equal to or higher than the threshold Th1 is performed has been described as an example. However, when the highest score is equal to or higher than a threshold Th4, which is higher than the threshold Th1, such as "3," a highlight display of the region in which the highest score is equal to or higher than the threshold Th4 can be performed regardless of a transition frequency of the highlight display. Accordingly, it is possible to perform association much faster by performing transition quickly in a case of an obviously-high highlight score.

Third Application Example

In the first embodiment, when there is no region having a highlight score equal to or higher than the threshold Th1 among highlight scores calculated by the first calculation unit 15d, the determination unit 15f ends the processing without performing any processing. However, here, a highlight display may be deleted when there is a region in which a highlight display is currently executed or when a predetermined period (such as 10 second) elapses after a highlight score of a region in which a highlight display is currently executed becomes lower than the threshold Th1. Accordingly, for example, when a description moves to a topic which is not in a document during the description, a highlight display is automatically deleted in a predetermined period. Thus, a listener does not mistake that a topic of a part displayed in a highlight is kept described.

Application Example of Document File

In the first embodiment, an example of using a document file created by presentation software has been described as an example. However, a document file created by a different application program can be also used. That is, by reading a page included in a document file of word-processing software as a slide or reading a sheet included in a document file of spreadsheet software as a slide, it is possible to apply the processing illustrated in FIG. 5 to FIG. 7 in a similar manner as long as a document file includes a page displayed in a unit of a screen during a display.

Different Example of Mounting

Note that in the first embodiment, a case where the presentation supporting device 10 provides the presentation supporting service in a stand-alone manner to execute the presentation software independently without depending on an external resource has been described as an example.

However, a different form of mounting can be employed. For example, it is possible to build a client server system by providing a server, which provides the presentation supporting service, to a client to execute presentation software. In this case, it is possible to mount a server device by installing, as package software or online software, a presentation supporting program that realizes the presentation supporting service. For example, the server device may be mounted as a Web server that provides the presentation supporting service or as a cloud that provides the presentation supporting service by outsourcing. In this case, a client starts making presentation after uploading a document file used for the presentation and identification information of a place where the presentation is made. When the presentation is started, the client uploads a sound signal collected by the microphone 3 in real-time and uploads page information of a slide each time a page of the slide currently displayed on the display device 5 is switched. Accordingly, the server device can perform the processing illustrated in FIG. 5 to FIG. 7. Moreover, when the client transmits operation information related to the input device 7 to the server and displays only a processing result transmitted from the server onto the display device 5, the client can be built as a thin client system. In this case, various resources such as document data are held by the server and presentation software is mounted in the server as a virtual machine. Note that in the first embodiment, a case where the presentation supporting program is added to the presentation software has been assumed. However, when a request for referring to the presentation supporting program as a library is received from a client with license authority, the presentation supporting program can be plugged in.

Application to Remote Meeting System

In the first embodiment, a case where a document displayed on one display device is shared and browsed by a plurality of people has been described as an example. However, application to a case where a plurality of terminals is connected to each other through a remote meeting system and one of the plurality of terminals designates a shared document and a highlight and transmits information to a different terminal can be also performed.

Presentation Supporting Program

Also, it is possible to realize various kinds of processing described in the above embodiments by executing a previously-prepared program with a computer such as a personal computer or a workstation. Thus, in the following, an example of a computer that executes a presentation supporting program having a function similar to those of the above embodiments will be described with reference to FIG. 10.

Figure 10:
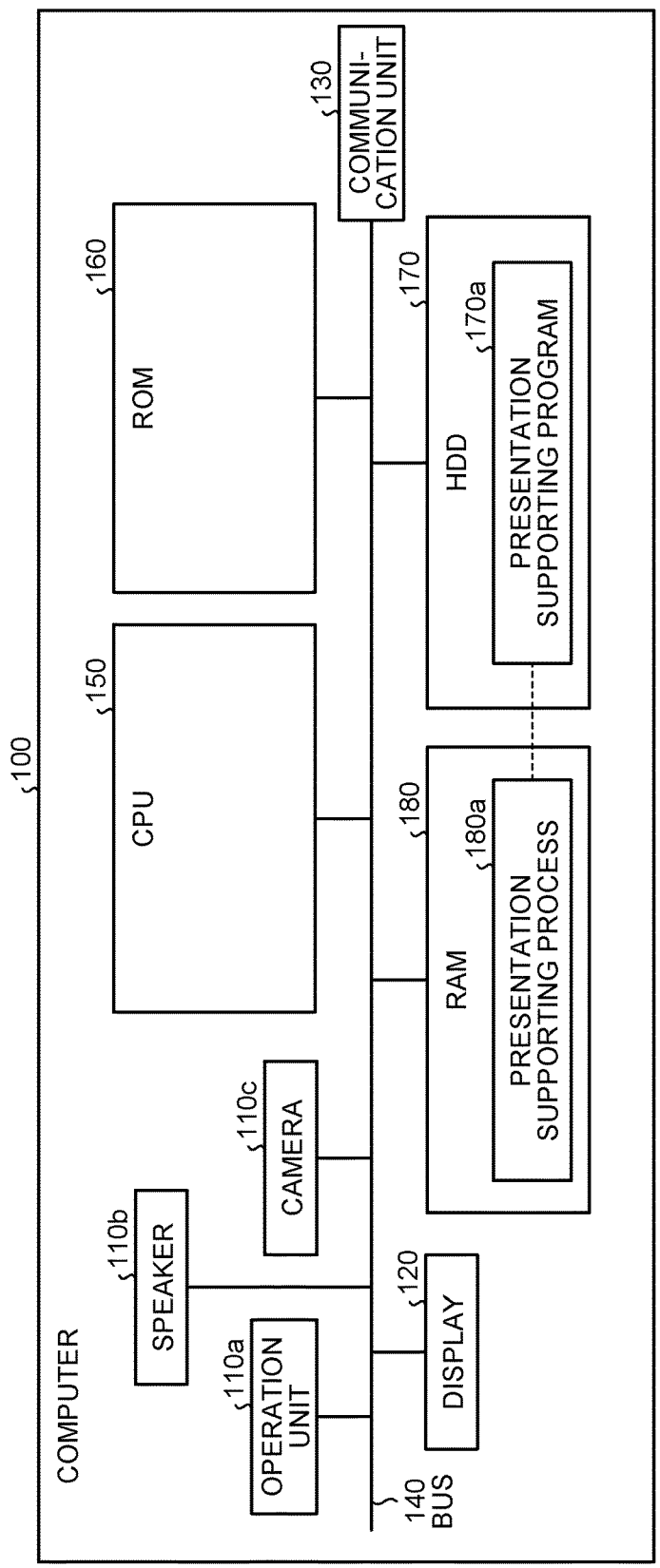
FIG. 10 is a view illustrating a hardware configuration example of a computer that executes a presentation supporting program according to first and second embodiments.

FIG. 10 is a view illustrating a hardware configuration example of a computer that executes the presentation supporting program according to the first and second embodiments. As illustrated in FIG. 10, a computer 100 includes an operation unit 110a, a speaker 110b, a camera 110c, a display 120, and a communication unit 130. Moreover, the computer 100 includes a CPU 150, a ROM 160, an HDD 170, and a RAM 180. These units 110 to 180 are connected to each other through a bus 140.

As illustrated in FIG. 10, the HDD 170 stores a presentation supporting program 170a having a function similar to those of the extraction unit 15a, the recognition unit 15b, the analysis unit 15c, the first calculation unit 15d, the second calculation unit 15e, the determination unit 15f, and the display control unit 15g described in the first embodiment. The presentation supporting program 170a may be integrated or separated similarly to configuration elements of the extraction unit 15a, the recognition unit 15b, the analysis unit 15c, the first calculation unit 15d, the second calculation unit 15e, the determination unit 15f, and the display control unit 15g illustrated in FIG. 2. That is, in the HDD 170, not all data described in the first embodiment is necessarily stored. Only data used for processing is to be stored into the HDD 170.

Under such an environment, the CPU 150 reads the presentation supporting program 170a from the HDD 170 and develops the program in the RAM 180. As a result, as illustrated in FIG. 10, the presentation supporting program 170a functions as a presentation supporting process 180a. The presentation supporting process 180a develops various kinds of data, which is read from the HDD 170, in a region assigned to the presentation supporting process 180a in a storage region included in the RAM 180 and executes various kinds of processing by using the various kinds of developed data. For example, an example of processing executed by the presentation supporting process 180a includes the processing illustrated in FIG. 5 to FIG. 7. Note that in the CPU 150, all processing units described in the first embodiment are not necessarily operated. Only a processing unit corresponding to processing to be executed needs to be virtually realized.

Note that the presentation supporting program 170a is not necessarily stored in the HDD 170 or ROM 160 from the beginning. For example, each program is stored into a flexible disk inserted into the computer 100, that is, a "portable physical medium" such as an FD, a CD-ROM, a DVD, a magneto-optical disk, or an IC card. Then, the computer 100 may acquire each program from these portable physical media and execute the program. Alternatively, each program may be stored in a different computer or a server device connected to the computer 100 through a public line, the Internet, a LAN, or a WAN and the computer 100 may acquire each program from these and execute the program.

According to an aspect, flapping of a highlight display can be controlled.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A presentation supporting device comprising:
a processor that executes a process comprising;
extracting a first word from a character string included in each region divided from a page of a document file including the page displayed in a unit of a screen during a display;
executing sound recognition;
first calculating a score, with respect to each region in a page currently-displayed on a predetermined display device, based on the first word extracted from the region and a second word acquired as a result of the sound recognition;
second calculating, when the highest score of the scores respectively-calculated for the regions is equal to or higher than a first threshold, a distance between a first region in which a highlight display is currently executed and a second region in which the highest score is equal to or higher than the first threshold;

first determining to execute a highlight display in the second region when a first frequency is equal to or higher than a second threshold, wherein the first frequency is one of frequencies included in frequency data, and corresponds to the distance between the first region and the second region, wherein the frequency data is data to which the distance between the first region and the second region and a frequency of occurrence of transition of a highlight display are associated; and second determining to hold transition of a highlight display in the first region, when the first frequency is lower than the second threshold, until a second frequency of the highest score becoming equal to or higher than the first threshold becomes equal to or higher than a third threshold wherein the first calculating includes calculating the scores by using at least one of an appearance frequency, the number of morae, and certainty of a result of the sound recognition which are related to the second word, and the certainty is a value that indicates how similar a recognition result is to a spectrum of each phoneme included in a standard model of a word.

2. The presentation supporting device according to claim 1, wherein the second calculating includes executing a calculation of the distance when the highest score of the scores respectively-calculated for the regions is higher than the score of the other region for predetermined times.

3. The presentation supporting device according to claim 1, wherein when the highest score is equal to or higher than a fourth threshold which is higher than the first threshold, the first determining includes determining to execute a highlight display in the second region even when the first frequency is lower than the second threshold.

4. The presentation supporting device according to claim 1, the process further comprising third calculating a change, which is in an angle of a line of sight before and after transition of the highlight display from the first region to the second region is performed, by using a size of a screen of the display device and a distance between the screen and a position of a predetermined point of view, wherein when the angle is equal to or greater than a fifth threshold, the second determining includes determining to execute the highlight display in the first region until the second frequency becomes equal to or higher than the third threshold.

5. A presentation supporting method comprising:

extracting, by a processor, a first word from a character string included in each region divided from a page of a document file including the page displayed in a unit of a screen during a display, executing, by the processor, sound recognition, first calculating a score, with respect to each region in a page currently-displayed on a predetermined display device, based on the first word extracted from the region and a second word acquired as a result of the sound recognition, second calculating, when the highest score of the scores respectively-calculated for the regions is equal to or higher than a first threshold, a distance between a first region in which the highlight display is currently executed and a second region in which the highest score is equal to or higher than the first threshold, by the processor, first determining to execute a highlight display in the second region when a first frequency is equal to or higher than a second threshold, by the processor, wherein the first frequency is one of frequencies included in frequency data, and corresponds to the distance between the first region and the second region, wherein the frequency data is data to which the distance between the first region and the second region and a frequency of occurrence of transition of a highlight display are associated, and second determining to hold transition of a highlight display in the first region, when the first frequency is lower than the second threshold, until a second frequency of the highest score being calculated to be equal to or higher than the first threshold becomes equal to or higher than a third threshold, by the processor wherein the first calculating includes calculating the scores by using at least one of an appearance frequency, the number of morae, and certainty of a result of the sound recognition which are related to the second word, and the certainty is a value that indicates how similar a recognition result is to a spectrum of each phoneme included in a standard model of a word.

6. A non-transitory computer-readable recording medium having stored therein a presentation supporting program that causes a computer to execute a process comprising:

extracting a first word from a character string included in each region divided from a page of a document file including the page displayed in a unit of a screen during a display;

executing sound recognition;

first calculating a score, with respect to each region in a page currently-displayed on a predetermined display device, based on the first word extracted from the region and a second word acquired as a result of the sound recognition;

second calculating, when the highest score of the scores respectively-calculated for the regions is equal to or higher than a first threshold, a distance between a first region in which the highlight display is currently executed and a second region in which the highest score is equal to or higher than the first threshold;

first determining to execute a highlight display in the second region when a first frequency is equal to or higher than a second threshold, wherein the first frequency is one of frequencies included in frequency data, and corresponds to the distance between the first region and the second region, wherein the frequency data is data to which the distance between the first region and the second region and a frequency of occurrence of transition of a highlight display are associated; and second determining to hold transition of a highlight display in the first region, when the first frequency is lower than the second threshold, until a second frequency of the highest score being calculated to be equal to or higher than the first threshold becomes equal to or higher than a third threshold wherein the first calculating includes calculating the scores by using at least one of an appearance frequency, the number of morae, and certainty of a result of the sound recognition which are related to the second word, and the certainty is a value that indicates how similar a recognition result is to a spectrum of each phoneme included in a standard model of a word.

* * * * *